United States Patent
Chen et al.

(10) Patent No.: US 11,120,331 B2
(45) Date of Patent: Sep. 14, 2021

(54) DEVICE AND METHOD FOR EXECUTING NEURAL NETWORK OPERATION

(71) Applicant: Cambricon Technologies Corporation Limited, Beijing (CN)

(72) Inventors: Yunji Chen, Beijing (CN); Shaoli Liu, Beijing (CN); Dong Han, Beijing (CN); Tianshi Chen, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 0 days.

(21) Appl. No.: 16/268,468

(22) Filed: Feb. 5, 2019

(65) Prior Publication Data
US 2019/0171932 A1 Jun. 6, 2019

Related U.S. Application Data

(63) Continuation-in-part of application No. PCT/CN2017/095810, filed on Aug. 3, 2017.

(30) Foreign Application Priority Data

Aug. 5, 2016 (CN) .......................... 201610635286.X

(51) Int. Cl.
*G06N 3/08* (2006.01)
*G06N 3/04* (2006.01)
(Continued)

(52) U.S. Cl.
CPC ............... *G06N 3/063* (2013.01); *G06N 3/04* (2013.01)

(58) Field of Classification Search
CPC .................................. G06N 3/063; G06N 3/04
(Continued)

(56) References Cited

U.S. PATENT DOCUMENTS

| 5,204,938 A | 4/1993 | Skapura et al. |
| 5,509,106 A * | 4/1996 | Pechanek ................. G06N 3/10 |
| | | 706/41 |

(Continued)

FOREIGN PATENT DOCUMENTS

| CN | 105488565 A | 4/2016 |
| CN | 105512723 A | 4/2016 |

(Continued)

OTHER PUBLICATIONS

Chen, et al., "A Small-Footprint Accelerator for Large-Scale Neural Networks", ACM Transactions on Computer Systems, vol. 33, No. 2, Article 6, May 2015, 27 pages.

(Continued)

*Primary Examiner* — Brandon S Cole
(74) *Attorney, Agent, or Firm* — Getech Law LLC; Jun Ye

(57) ABSTRACT

Aspects for performing neural network operations are described herein. The aspects may include a first neural network processing module configured to process at least a portion of neural network data and an on-chip interconnection module communicatively connected to the first neural network processing module and one or more second neural network processing modules. The on-chip interconnection module may include a first layer interconnection module configured to communicate with an external storage device and one or more second layer interconnection modules respectively configured to communicate with the first neural network processing module and the one or more second neural network processing modules. Further, the first neural network processing module may include a neural network processor configured to perform one or more operations on the portion of the neural network data and a high-speed (Continued)

storage device configured to store results of the one or more operations.

23 Claims, 6 Drawing Sheets

(51) Int. Cl.
| | | |
|---|---|---|
| | *G06N 3/02* | (2006.01) |
| | *G06Q 30/00* | (2012.01) |
| | *G06Q 20/40* | (2012.01) |
| | *G06N 3/063* | (2006.01) |
| | *G06K 9/66* | (2006.01) |
| | *G06T 17/05* | (2011.01) |
| | *G06F 15/17* | (2006.01) |
| | *G06K 9/00* | (2006.01) |

(58) Field of Classification Search
USPC .................................................. 706/1–62
See application file for complete search history.

(56) References Cited

U.S. PATENT DOCUMENTS

| | | | | |
|---|---|---|---|---|
| 2011/0289177 | A1* | 11/2011 | Archer | G06F 15/17318 709/212 |
| 2012/0082366 | A1* | 4/2012 | Marugame | G06K 9/0014 382/133 |
| 2016/0147936 | A1* | 5/2016 | Vendruscolo | G16B 15/00 702/19 |
| 2016/0342887 | A1* | 11/2016 | Tieleman | G06N 3/084 |
| 2017/0024641 | A1* | 1/2017 | Wierzynski | G06N 3/0454 |

FOREIGN PATENT DOCUMENTS

| | | |
|---|---|---|
| WO | 2013118008 A1 | 8/2013 |
| WO | 2016037351 A1 | 3/2016 |

OTHER PUBLICATIONS

Du, et al., "An Accelerator for High Efficient Vision Processing", IEEE Transactions on Computer-aided Design of Integrated Circuits and System, vol. 36, No. 2, Feb. 2017, pp. 227-240.

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X" An Accelerator for Sparse Neural Networks, The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of the ACM, vol. 59, No. 11, Nov. 2016, pp. 105-112.

Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

PCT/CN2017/095810—International Search Report, dated Nov. 7, 2017, 9 pages. (no English translation).

CN201610635286.X, Official Action dated Aug. 22, 2019, 10 pages. (no English translation).

CN201610635286.X, Official Action dated Oct. 22, 2019, 3 pages. (no English translation).

EP17836414.7, European Search Report dated May 20, 2020, 7 pages.

Hasan Raqibul et al: "Routing bandwidth model for feed forward neural networks on multicore neuromorphic architectures", The 2013 International Joint Conference on Neural Networks; Aug. 4, 2013, 8 pages.

* cited by examiner

DEVICE AND METHOD FOR EXECUTING NEURAL NETWORK OPERATION

CROSS-REFERENCE TO RELATED APPLICATIONS

The present invention is a continuation-in-part of PCT Application No. PCT/CN2017/095810, filed on Aug. 3, 2017, which claims priority to commonly owned CN Application No. 201610635286.X, filed on Aug. 5, 2016. The entire contents of each of the aforementioned applications are incorporated herein by reference.

BACKGROUND

Multilayer neural networks (MNN) are widely applied to fields such as pattern recognition, image processing, functional approximation, and optimal computation. In recent years, due to the higher recognition accuracy and better parallelizability, multilayer artificial neural networks have received increasing attention by academic and industrial communities.

A known method to perform the matrix multiplication of a multilayer artificial neural network is to use a general-purpose processor. Such a method uses a general-purpose register file and a general-purpose functional unit to execute general-purpose instructions to support algorithms in MNNs. However, one of the defects of the method is the low operational performance of a single general-purpose processor which cannot meet performance requirements for usual multilayer neural network operations. When multiple general-purpose processors execute concurrently, the intercommunication among them also becomes a performance bottleneck.

Another known method to perform the matrix multiplication of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then model data (weight values) of a multilayer artificial neural network may be repeatedly moved from the off-chip, and off-chip bandwidth becomes the main performance bottleneck, causing huge power consumption.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for neural network processing. The example apparatus may include a first neural network processing module configured to process at least a portion of neural network data and an on-chip interconnection module communicatively connected to the first neural network processing module and one or more second neural network processing modules. The on-chip interconnection module may include a first layer interconnection module configured to communicate with an external storage device, and one or more second layer interconnection modules respectively configured to communicate with the first neural network processing module and the one or more second neural network processing modules. The first neural network processing module may include a neural network processor configured to perform one or more operations on the portion of the neural network data and a high-speed storage device configured to store results of the one or more operations.

Another example aspect of the present disclosure provides an example method for neural network processing. The example method may include processing, by a first neural network processing module, at least a portion of neural network data. In addition, the example method may include communicating, by a first layer interconnection module included in an on-chip interconnection module, with an external storage device, wherein the on-chip interconnection module is communicatively connected to the first neural network processing module and one or more second neural network processing modules. Further, the example method may include respectively communicating, by one or more second layer interconnection modules included in the on-chip interconnection module, with the first neural network processing module and the one or more second neural network processing modules. Further still, the example method may include storing, by a high-speed storage device included in the first neural network processing module, results of the one or more operations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for the clear and concise purpose, some known functionality and structure are not described. Besides, identical reference numbers refer to identical function and operation throughout the accompanying drawings.

A multi-layer neural network (MNN) may refer to more than one layer of artificial neurons or nodes. The neurons or nodes here may refer to respective groups of operations, rather than physical nodes or devices. Operations at each layer of the MNN may be divided and respectively performed by one or more neural network processing modules. The neural network processing modules may be configured to communicate with each other via an on-chip interconnection module. The results generated by one neural network processing module may be transmitted to and shared with other neural network processing modules for the operations of a next layer via the on-chip interconnection module. Since multiple neural network processing modules are implemented in processing data in the MNN, the computational power of a single neural network processing module may no longer be the bottleneck of the entire system. In addition, the on-chip interconnection module may be designated to handle the data traffic among the neural network processing modules to increase the efficiency of the communication.

Figure 1A:
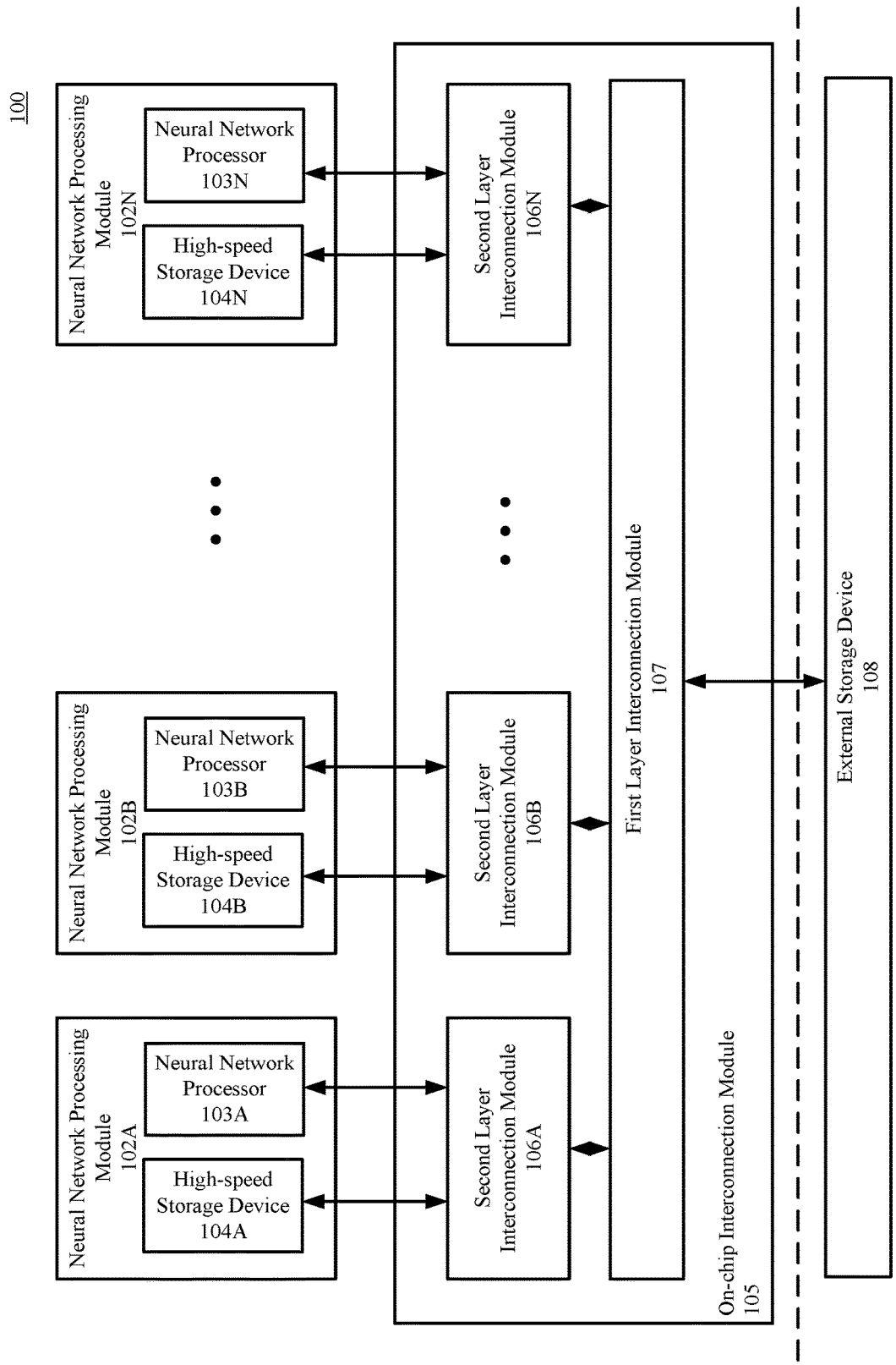
FIG. 1A illustrates a block diagram of an example system by which neural network processing may be implemented.

FIG. 1A illustrates a block diagram of an example system 100 by which neural network processing may be implemented. As depicted, the example system 100 may include one or more neural network processing modules (e.g., 102A, 102B . . . 102N, collectively referred to as "neural network processing modules 102"). The neural network processing modules 102 may be communicatively connected with an on-chip interconnection module 105. The on-chip interconnection module 105 may be implemented with the neural network processing modules 102 on a same chip or integrated circuit to provide communication among the neural network processing modules 102. As such, the neural network processing modules 102 may not be required to access data external to the chip or integrated circuit. Thus, the off-chip bandwidth between the neural network processing modules 102 and an external storage device 108 may not be the bottleneck of the entire computing system.

Pre-processed data may be disseminated to the neural network processing modules 102 via the on-chip interconnection module 105. Subsequently, results of the processing at the neural network processing modules 102 may also be shared via the on-chip interconnection module 105. The on-chip interconnection module 105 may be configured to receive data from and/or transmit data to the external storage device 108. The external storage device 108, for example, may be implemented as hardware components, e.g., application specific integrated circuit (ASIC), Coarse-grained reconfigurable architectures (CGRAs), field-programmable gate arrays (FPGAs), analog circuits, memristor, etc.

In an example where the example system 100 is configured to process data in a single layer neural network, the neural network processing modules 102 may be configured to process a portion of the data. Results of the process at respective neural network processing modules 102 may be combined by one of the neural network processing modules 102, e.g., neural network processing module 102A, to achieve final results for the single layer neural network.

In other examples where the example system 100 is configured to process data in a multi-layer neural network, the neural network processing modules 102 may be configured to process a portion of data at one layer. Results of such processing may be transmitted via the on-chip interconnection module 105 and shared among the neural network processing modules 102 for processing at a subsequent layer.

Each of the neural network processing modules 102 may include a neural network processor (e.g., neural network processor 103A, 103B . . . 103N, collectively "neural network processors 103") configured to perform one or more operations on the portion of data. The portion of data and/or results of the operations may be temporarily stored in a high-speed storage device (e.g., high-speed storage device 104A, 104B . . . 104N, collectively "high-speed storage devices 104") included in each of the neural network processing modules 102. The neural network processor 103A and the high-speed storage device 104A may be configured to communicate with a second layer interconnection module 106A in the on-chip interconnection module 105. Similarly, other neural network processors 103 and high-speed storage devices 104 may be respectively configured to communicate with a corresponding second layer interconnection module, e.g., 106B . . . 106N.

The second layer interconnection modules, collectively numbered as 106, may be configured to communicate with a first layer interconnection module 107 in the on-chip interconnection module 105. The first layer interconnection module 107 may be configured to receive data from or transmit data to the external storage device 108.

In processing neural network data, for example, the neural network processor 103A may be configured to retrieve data from the high-speed storage device 104A, from other neural network processors 103 via the first layer interconnection module 107 of the on-chip interconnection module 105, or from other high-speed storage devices 104 in other neural network processing modules 102 via the first layer interconnection module 107 of the on-chip interconnection module 105. Other neural network processors 103 may be configured to similarly retrieve data simultaneously via the on-chip interconnection module 105.

The neural network processor 103A may be configured to further store results of such processing to the high-speed storage device 104A, to other neural network processors 103 via the first layer interconnection module 107 of the on-chip interconnection module 105, or to other high-speed storage devices 104 in other neural network processing modules 102 via the first layer interconnection module 107 of the on-chip interconnection module 105. Since each of neural network processors 103 may be configured to access data in other neural network processing modules 102, traffic between the neural network processing modules 102 and the external storage device 108 may be reduced.

Figure 1B:
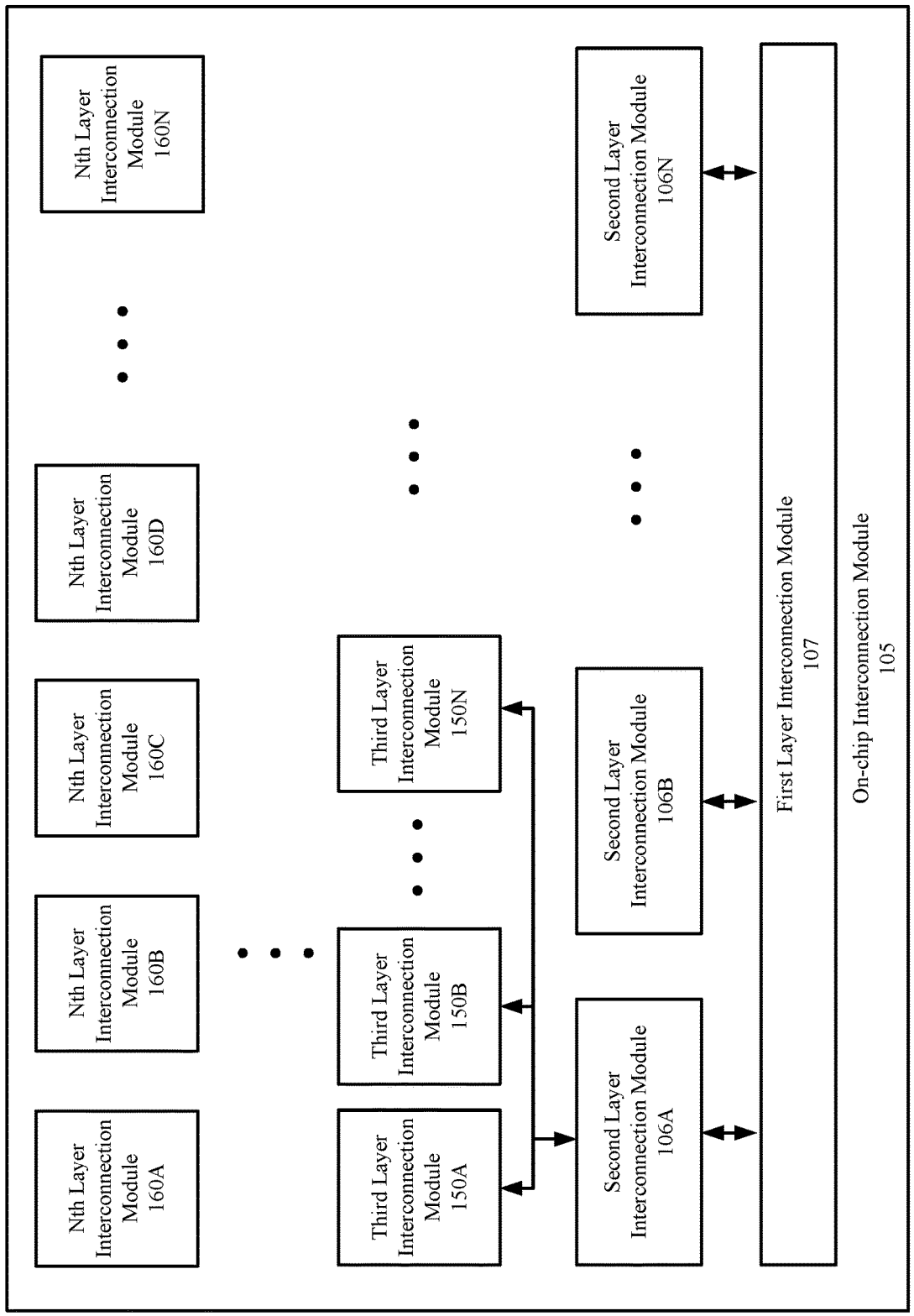
FIG. 1B illustrates a block diagram of an example on-chip interconnection module 105 by which neural network processing may be implemented.

FIG. 1B illustrates a block diagram of an example on-chip interconnection module 105 by which neural network processing may be implemented.

As depicted, in some examples, the on-chip interconnection module 105 may include more than two layers of sub-components. That is, in addition to the first layer interconnection module 107 and the second layer interconnection modules 106, the on-chip interconnection module 105 may further include multiple layers of sub-components. For example, each of the second layer interconnection modules 106 may be communicatively connected to one or more third layer interconnection modules 150. Similarly, each of the third layer interconnection modules 150 may be communicatively connected to one or more fourth layer interconnection modules (not shown).

In some example, the on-chip interconnection module 105 may be structured as a tree that includes multiple levels (e.g., from a root node to top nodes). The top nodes may include multiple $N^{th}$ layer interconnection modules 160. The top nodes (e.g., the multiple $N^{th}$ layer interconnection modules 160) may be configured to communicatively connected to the neural network processing modules 102. The data received from the neural network processing modules 102 may be transmitted to and combined at the nodes at the lower levels. Additionally, or alternatively, the data may be added at the nodes at the lower levels. When the combined or added data reaches the root node, e.g., the first layer interconnection module 107, the root node may be configured to transmit the data to the external storage device 108. Vice versa, the root node, e.g., the first layer interconnection module 107, may receive data from the external storage device 108 and disseminate the data to the neural network processing modules 102 via the multiple nodes, e.g., third layer interconnection modules 150 and $N^{th}$ layer interconnection modules 160.

Figure 2:
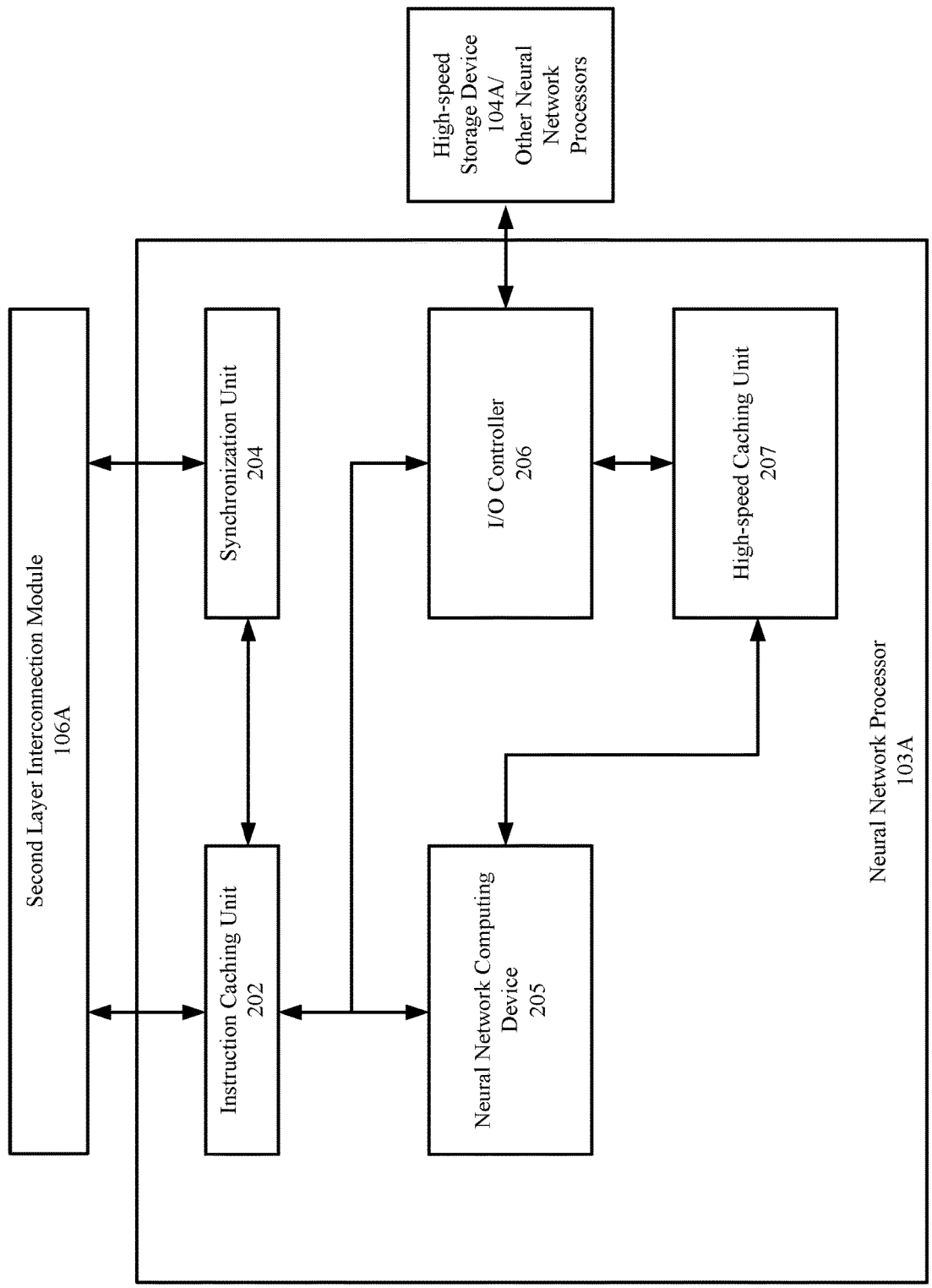
FIG. 2 illustrates a block diagram of an example neural network processor by which neural network processing may be implemented.

FIG. 2 illustrates a block diagram of an example neural network processor 103A by which neural network processing may be implemented. Other neural network processors 103 may be similarly configured to include similar components. As depicted, the neural network processor 103A may include an instruction caching unit 202 configured to receive one or more instructions from the second layer interconnection module 106A. The instruction caching unit 202 may be implemented as an on-chip buffer, an on-chip Static Random Access Memory (SRAM), or other types of on-chip storage devices that may provide higher access speed than the external storage device 108. The one or more instructions may be stored in a first-in-first-out order as an instruction queue and may be transmitted to a neural network computing device 205 sequentially. The instructions may include an ACK instruction, a FENCE instruction, a SYNC instruction, a COMPUTE instruction, an IO instruction, etc., and may be formatted according to the table below.

TABLE 1

| Name | Operation code 1 | Operation code 2 | Operation code 3 | Operation code 4 | Operation code 5 | . . . . . . |
|---|---|---|---|---|---|---|
| ACK | 0/1 | 0/1 | 0/1 | 0/1 | 0/1 | . . . . . . |
| FENCE | 0/1 | 0/1 | 0/1 | 0/1 | 0/1 | . . . . . . |
| SYNC | 0/1 | 0/1 | 0/1 | 0/1 | 0/1 | . . . . . . |
| COMPUTE | MLP | addr1 | size1 | addr2 | size2 | . . . . . . |
| IO | src | dest | size | | | |

As shown above, the ACK instruction may include one or more operation codes that respectively represent other neural network processors 103. The values of the operation codes may indicate whether the neural network processor 103A is to transmit an ACK signal to a corresponding neural network processor 103. For example, when the neural network processor 103A transmits results of data processing to other neural network processors 103 for further processing of the next layer of MNN, other neural network processors 103 may be configured to respond with a writing response as feedback. When the neural network processor 103A transmits all the results of data processing and receives all the writing responses, the neural network processor 103A may be configured to transmit an ACK signal to other neural network processors to indicate that the data transmission is completed.

The FENCE instruction may similarly include one or more operation codes that respectively represent other neural network processors 103. The values of the operation codes may indicate whether a receiving neural network processor, e.g., 103B, is to check if an ACK signal is received from a transmitting neural network processor, e.g. 103A.

The SYNC instruction may similarly include one or more operation codes that respectively represent other neural network processors 103. The values of the operation codes may indicate whether a corresponding neural network processor, e.g., 103B, should stop current processing for synchronization with the neural network processor 103A.

Upon receiving the SYNC instruction, a synchronization unit 204 may be configured to broadcast one or more SYNC signals to the corresponding neural network processors indicated by the respective operation codes. When other neural network processors 103 execute another SYNC instruction, the synchronization unit 204 may be configured to receive SYNC signals or SYNC responses from other neural network processors 103 and to notify the neural network computing device 205 to pause processing.

The COMPUTE instruction may include a first COMPUTE operation code that indicates a computation operation to be performed by the neural network computing device 205, e.g., a pooling operation, a multi-layer perceptron (MLP) operation, a convolution operation, etc. The COMPUTE instruction may further include a second COMPUTE operation code, a third COMPUTE operation code, a fourth COMPUTE operation code, and a fifth COMPUTE operation code. The second COMPUTE operation code may indicate a starting address of input data; the third COMPUTE operation code may indicate a size or length of the input data; the fourth COMPUTE operation code may indicate a starting address of output data; and the fifth COMPUTE operation code may indicate a size or length of the output data. The starting addresses here may refer to an address in the high-speed storage devices 104.

The IO instruction may include one or more IO operation codes that respectively represent a source address, a destination address, and a size or length of a block of data to be moved from the source address to the destination address. The source address and the destination address may respectively refer to addresses in the high-speed storage devices 104, high-speed caching units 207, or the external storage device 108. The IO instruction may be transmitted by the instruction caching unit 202 to an I/O controller 206. The I/O controller 206 may be configured to retrieve a block of data according to the size or length indicated in the TO instruction from the source address in a high-speed caching unit 207, in the high-speed storage device 104A, or in other neural network processing modules 102. The I/O controller 206 may be configured to further transmit the retrieved block of data to the destination address in the high-speed caching unit 207, in the high-speed storage device 104A, or in other neural network processing modules 102. The high-speed caching unit 207, in some examples, may be implemented as an on-chip buffer, an on-chip Static Random Access Memory (SRAM), or other types of on-chip storage devices that may provide higher access speed than the external storage device 108.

Figure 3:
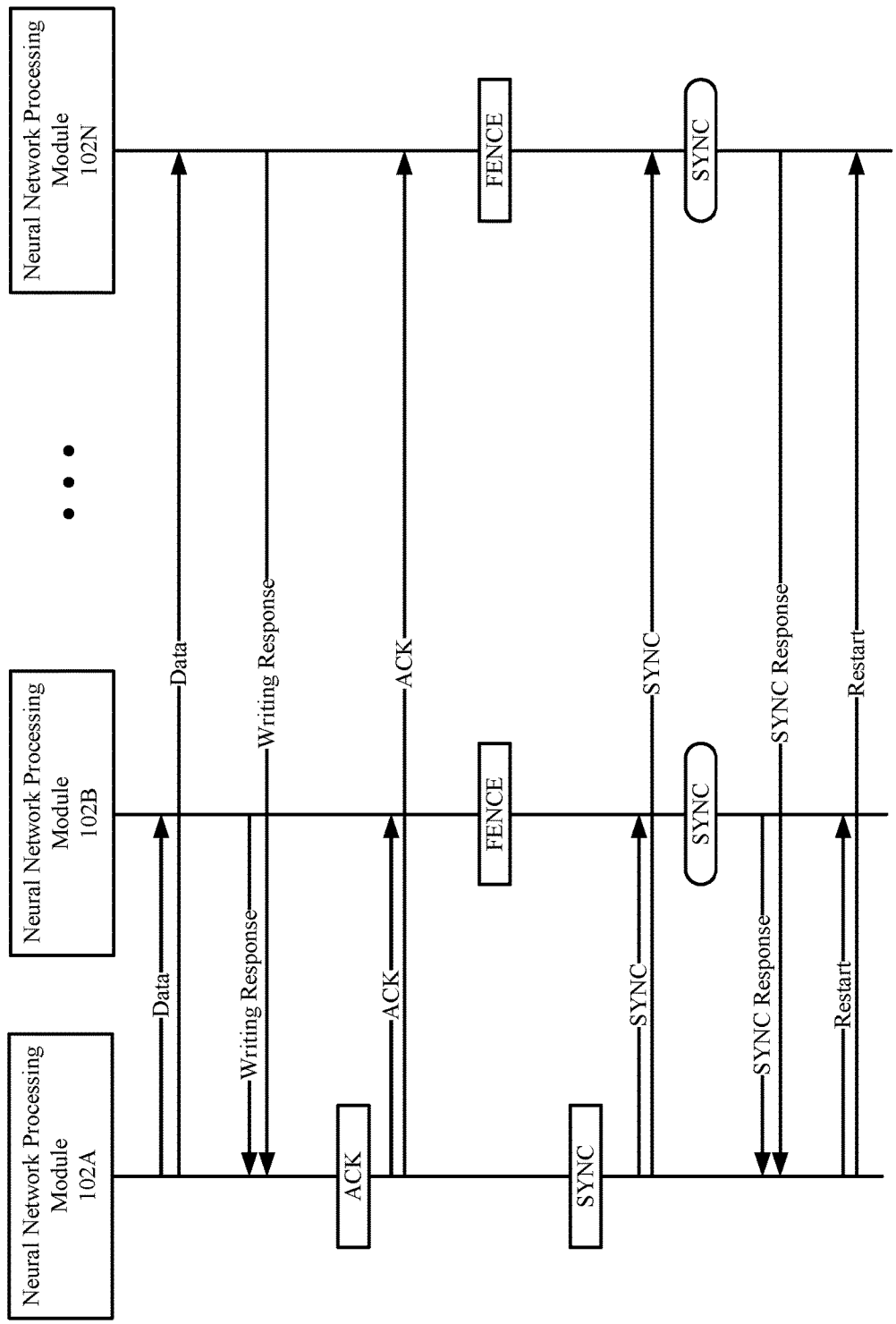
FIG. 3 illustrates a diagram of example interactions between multiple neural network processing modules.

FIG. 3 illustrates a diagram of example interactions between multiple neural network processing modules.

As depicted, the neural network processing module 102A may be configured to initially transmit data, e.g., results of processing data in a current layer of the MNN, to one or more of other neural network processing modules 102, e.g., 102B and 102N.

The interactions may start from the neural network processing module 102A transmitting data, e.g., results of processing, to the neural network processing modules 102B and 102N. Upon receiving the data from the neural network processing module 102A, the neural network processing module 102B and 102N may respectively transmit a writing response to the neural network processing module 102A. When the neural network processing module 102A receives the writing responses, the neural network processing module 102A may be configured to execute an ACK instruction. That is, the neural network processing module 102A may be configured to transmit one or more ACK signals to the neural network processing modules 102B and 102N to indicate that the data has been transmitted entirely.

Further, the neural network processing modules 102B and 102N may be configured to check whether data transmissions from the neural network processing module 102A, or from other neural network processing modules are completed. For example, the neural network processing modules 102B and 102N may be configured to execute a FENCE instruction. When the neural network processing module 102B and 102N receive ACK signals from all transmitting neural network processing modules including the neural network processing module 102A, the neural network processing modules 102B and 102N may continue to perform one or more operations on the received data since the data transmission from other neural network processing modules is completed.

In some examples, multiple neural network processing modules may be configured to stop processing to synchronize with each other. For example, the neural network processing module 102A may be configured to initiate the synchronization by broadcasting one or more SYNC signals to those neural network processing modules that are required to synchronize. In more detail, the neural network processing module 102A may be configured to transmit SYNC signals to the neural network processing module 102B and 102N. Upon receiving the SYNC signals, the neural network processing module 102B and 102N may be configured to stop processing data and enter a SYNC state. In response to the SYNC signals, the neural network processing modules 102B and 102N may be configured to respectively transmit a SYNC response to the neural network processing module 102A. When the neural network processing module 102A receives the SYNC responses, the neural network processing module 102A may be configured to transmit restart signals to the neural network processing modules 102B and 102N. The neural network processing modules 102B and 102N may then continue to process data.

Figure 4:
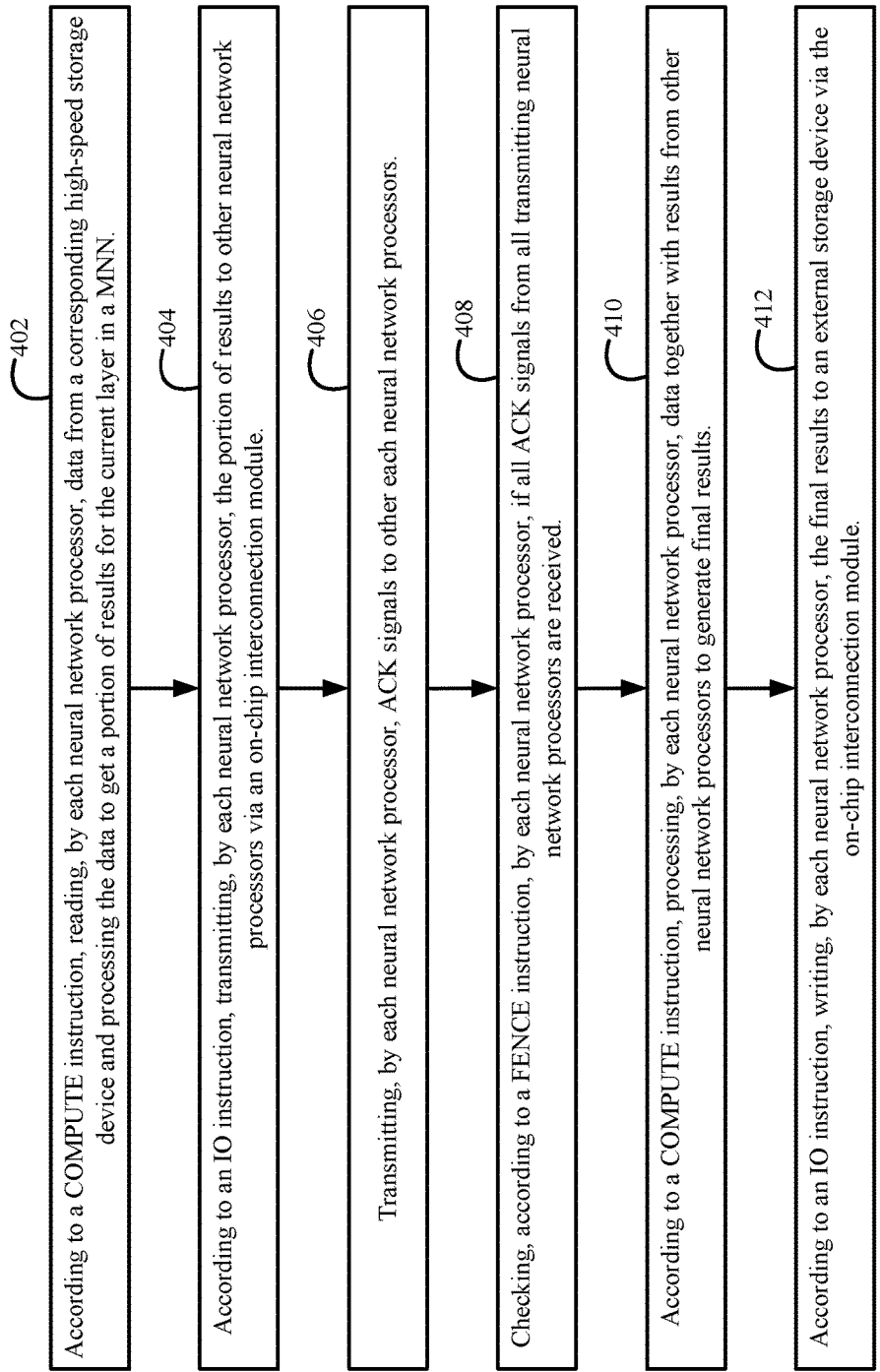
FIG. 4 illustrates a flow chart of an example method for neural network processing.

FIG. 4 illustrates a flow chart of an example method 400 for neural network processing. The example method 400 may be performed by one or more components of the apparatus of FIGS. 1, 2, and 3.

At block 402, the example method 400 may include reading, by each neural network processor, data from a corresponding high-speed storage device and processing the data to get a portion of results for the current layer in an MNN according to a COMPUTE instruction. For example, upon receiving a COMPUTE instruction, the neural network processor 103A may be configured to read data from the high-speed storage device 104A and process the data to generate at least a portion of results for the current layer in the MNN. More specifically, the instruction caching unit 202 may be configured to transmit the COMPUTE instruction to the neural network computing device 205 and the I/O controller 206. The I/O controller 206 may be configured to retrieve data from the high-speed storage device 104A and store the data in the high-speed caching unit 207. The neural network computing device 205 may be configured to read the data from the high-speed caching unit 207 and perform one or more operations indicated in the COMPUTE instruction on the data to generate the portion of results.

At block 404, the example method 400 may include transmitting, by each neural network processor, the portion of results to other neural network processors via an on-chip interconnection module according to an IO instruction. For example, the neural network processor 103A may be configured to transmit the portion of results to other neural network processors, e.g., 103B and 103N, according to an IO instruction. More specifically, the neural network computing device 205 may be configured to store the portion of results in the high-speed caching unit 207. The instruction caching unit 202 may be configured to transmit the TO instruction to the I/O controller 206. The I/O controller 206 may be configured to execute the IO instruction by reading the portion of results from the high-speed caching unit 207 and transmitting the portion of results to one or more other neural network processors 103 via the on-chip interconnection module 105. Meanwhile, the neural network processor 103A may receive other portions of results processed and transmitted by other neural network processors 103.

At block 406, the example method 400 may include transmitting, by each neural network processor, ACK signals to other each neural network processors. For example, the neural network processor 103A may be configured to transmit one or more ACK signals to other neural network processors, e.g., 103B and 103N, to indicate that data transmission is completed.

At block 408, the example method 400 may include checking, by each neural network processor, if all ACK signals from all transmitting neural network processors are received according to a FENCE instruction. For example, the neural network processor 103B may be configured to check if an ACK signal is received from the neural network processor 103A or other transmitting neural network processors 103 in accordance with a FENCE instruction.

At block 410, the example method 400 may include processing, by each neural network processor, data together with results from other neural network processors to generate final results according to a COMPUTE instruction. For example, the neural network processor 103A may be configured to receive processing results from other neural network processors 103 and to process the received results with data received from the high-speed storage device 104A to generate final results.

At block 412, the example method 400 may include writing, by each neural network processor, the final results to an external storage device via the on-chip interconnection module in accordance with an IO instruction. For example, the neural network processor 103A may be configured to store the final results to the external storage device 108 via the on-chip interconnection module 105.

Figure 5:
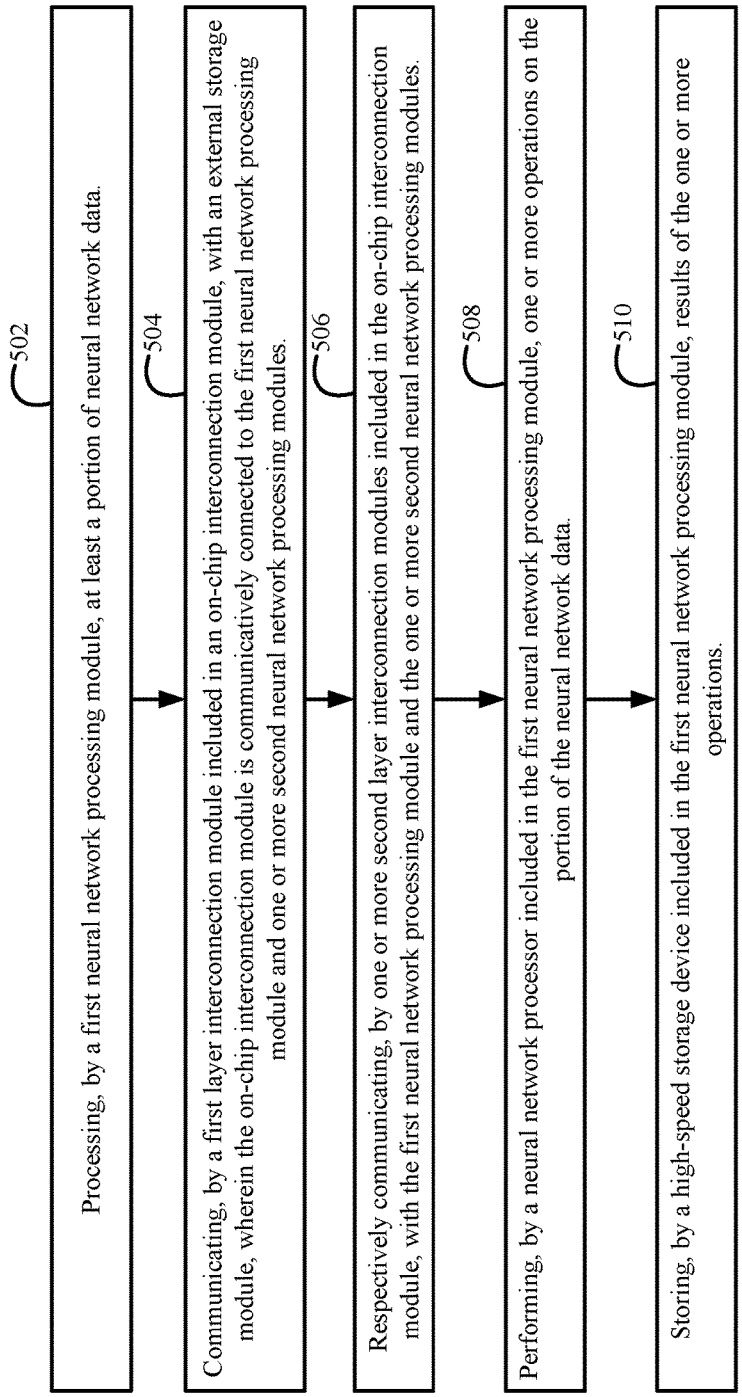
FIG. 5 illustrates another flow chart of another example method for neural network processing.

FIG. 5 illustrates another flow chart of another example method 500 for neural network processing. The example method 500 may be performed by one or more components of the apparatus of FIGS. 1, 2, and 3.

At block 502, the example method 500 may include processing, by a first neural network processing module, at least a portion of neural network data. For example, the neural network processing module 102A may be configured to process a portion of neural network data to generate at least a portion of results for the current layer of the MNN.

At block 504, the example method 500 may include communicating, by a first layer interconnection module included in an on-chip interconnection module, with an external storage device. For example, the first layer interconnection module 107 of the on-chip interconnection module 105 may be configured to communicate with the external storage device 108.

At block 506, the example method 500 may include respectively communicating, by one or more second layer interconnection modules included in the on-chip interconnection module, with the first neural network processing module and the one or more second neural network processing modules. For example, the second layer interconnection modules 106 may be configured to respectively communicate with the neural network processing modules 102.

At block 508, the example method 500 may include performing, by a neural network processor included in the first neural network processing module, one or more operations on the portion of the neural network data. For example, the neural network processor 103A may be configured to perform one or more operations in accordance with one or more instructions, e.g., a COMPUTE instruction, on the portion of the neural network data.

At block 510, the example method 500 may include storing, by a high-speed storage device included in the first neural network processing module, results of the one or more operations. For example, the results of the one or more operations performed by the neural network processor 103A may be stored by the high-speed storage device 104A.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. An apparatus for neural network processing, comprising:
   a first neural network processing module configured to process at least a portion of neural network data of a neural network; and
   an on-chip interconnection module communicatively connected to the first neural network processing module and one or more second neural network processing modules configured to process other portions of the neural network data of the neural network,
   wherein the first neural network processing module includes:
      a first neural network processor configured to:
         perform one or more computation operations on the portion of the neural network data,
         transmit results of the one or more computation operations to the one or more second neural network processing modules via the on-chip interconnection module, and
      a first high-speed storage device configured to store the results of the one or more computation operations, and
   wherein each of the second neural network processing modules includes:
      a second neural network processor configured to process the other portions of the neural network data to generate processing results, and
      a second high-speed storage device configured to store results of the processing results, wherein the second neural network processor is configured to:

transmit the processing results to other second neural network processing modules or the first neural network processing module, receive the results of the one or more computation operations from the first neural network processing module or processing results from other second neural network processing modules, and combine the results of the one or more computation operations from the first neural network processing module or the processing results from other second neural network processing modules with the processing results to generate final results of a layer of the neural network.

2. The apparatus of claim 1, wherein each of the first neural network processor and the one or more second neural network processing processors includes:
an instruction caching unit configured to store one or more instructions that indicate the one or more computation operations to be performed; and
a neural network computing device configured to execute one of the one or more instructions.

3. The apparatus of claim 2, wherein the one or more instructions include:
an ACK instruction that includes one or more ACK operation codes respectively corresponding to the one or more second neural network processing modules, wherein each of the ACK operation codes indicates whether the first neural network processing module is to transmit a first ACK signal to the corresponding second neural network processing module to indicate data transmission is completed.

4. The apparatus of claim 2, wherein the one or more instructions include:
a FENCE instruction that includes one or more FENCE operation codes respectively corresponding to the one or more second neural network processing modules, wherein each of the FENCE operation codes indicates whether the first neural network processing module is to check a second ACK signal is received from the corresponding second neural network processing module.

5. The apparatus of claim 2, wherein the one or more instructions include:
a SYNC instruction that includes one or more SYNC operation codes respectively corresponding to the one or more second neural network processing modules, wherein each of the SYNC operation codes indicates whether the corresponding second neural network processing module is to be paused for synchronization.

6. The apparatus of claim 2, wherein the one or more instructions include:
a COMPUTE instruction that includes a first COMPUTE operation code that indicates a computation operation, a second COMPUTE operation code that indicates a first address of a first portion of data, a third COMPUTE operation code that indicates a first length of the first portion of data, a fourth COMPUTE operation code that indicates a second address of a second portion of data, and a fifth COMPUTE operation code that indicates a second length of the second portion of data.

7. The apparatus of claim 2, wherein the one or more instructions include:
an IO instruction that includes a first IO operation code that indicates a source address, a second IO operation code that indicates a destination address, and a third IO operation code that indicates a size of a data block stored to be moved from the source address to the destination address.

8. The apparatus of claim 1, wherein each of the first neural network processor and the one or more second neural network processing processors includes a synchronization unit configured to transmit one or more synchronization signals to one or more of the second neural network processing modules.

9. The apparatus of claim 1, wherein each of the first neural network processor and the one or more second neural network processing processors includes an I/O controller configured to receive data from the high-speed storage device and the second neural network processing modules.

10. The apparatus of claim 1, wherein each of the first neural network processor and the one or more second neural network processing processors includes a high-speed caching unit configured to temporarily store one or more execution results generated by the neural network computing device.

11. The apparatus of claim 1, wherein the on-chip interconnection module includes:
a first layer interconnection module configured to communicate with an external storage device, and
one or more second layer interconnection modules respectively configured to communicate with the first neural network processing module and the one or more second neural network processing modules.

12. The apparatus of claim 1, wherein the on-chip interconnection module includes
a first layer interconnection module configured to communicate with an external storage device, and
one or more groups of interconnection modules,
wherein at least one of the one or more groups of interconnection modules are communicatively connected to the first layer interconnection module,
wherein at least another of the one or more groups of interconnection modules are communicatively connected to the first neural network processing module and the one or more second neural network processing modules, and
wherein the one or more groups of interconnection modules are structured as a tree that includes the first layer interconnection module as a root node.

13. A method for neural network processing, comprising:
processing, by a first neural network processing module, at least a portion of neural network data of a neural network;
processing, by one or more second neural network processing modules, other portions of the neural network data of the neural network to generate processing results;
communicating, by an on-chip interconnection module, with an external storage device, wherein the on-chip interconnection module is communicatively connected to the first neural network processing module and the one or more second neural network processing modules;
communicating, by the on-chip interconnection module, with the first neural network processing module and the one or more second neural network processing modules;
performing, by a first neural network processor included in the first neural network processing module, one or more computation operations on the portion of the neural network data;

transmitting, by the first neural network processor, results of the one or more computation operations to the one or more second neural network processing modules via the on-chip interconnection module, storing, by a high-speed storage device included in the first neural network processing module, results of the one or more computation operations, transmitting, by a second neural network processor of each of the second neural network processing modules, the processing results to other second neural network processing modules or the first neural network processing module, receiving, by the second neural network processor of each of the second neural network processing modules, the results of the one or more computation operations from the first neural network processing module or processing results from other second neural network processing modules; and combining the results of the one or more computation operations from the first neural network processing module or the processing results from other second neural network processing modules with the processing results to generate final results of a layer of the neural network.

14. The method of claim 13, further comprising:

storing, by an instruction caching unit of each of the first neural network processor and the one or more second neural network processing processors, one or more instructions that indicate the one or more computation operations to be performed; and executing, by a neural network computing device of each of the first neural network processor and the one or more second neural network processing processors, one of the one or more instructions.

15. The method of claim 14, wherein the one or more instructions include:

an ACK instruction that includes one or more ACK operation codes respectively corresponding to the one or more second neural network processing modules, wherein each of the ACK operation codes indicates whether the first neural network processing module is to transmit a first ACK signal to the corresponding second neural network processing module to indicate data transmission is completed.

16. The method of claim 14, wherein the one or more instructions include:

a FENCE instruction that includes one or more FENCE operation codes respectively corresponding to the one or more second neural network processing modules, wherein each of the FENCE operation codes indicates whether the first neural network processing module is to check a second ACK signal is received from the corresponding second neural network processing module.

17. The method of claim 14, wherein the one or more instructions include:

a SYNC instruction that includes one or more SYNC operation codes respectively corresponding to the one or more second neural network processing modules, wherein each of the SYNC operation codes indicates whether the corresponding second neural network processing module is to be paused for synchronization.

18. The method of claim 14, wherein the one or more instructions include:

a COMPUTE instruction that includes a first COMPUTE operation code that indicates a computation operation, a second COMPUTE operation code that indicates a first address of a first portion of data, a third COMPUTE operation code that indicates a first length of the first portion of data, a fourth COMPUTE operation code that indicates a second address of a second portion of data, and a fifth COMPUTE operation code that indicates a second length of the second portion of data.

19. The method of claim 14, wherein the one or more instructions include:

an TO instruction that includes a first TO operation code that indicates a source address, a second TO operation code that indicates a destination address, and a third TO operation code that indicates a size of a data block stored to be moved from the source address to the destination address.

20. The method of claim 13, further comprising transmitting, by a synchronization unit of each of the first neural network processor and the one or more second neural network processing processors, one or more synchronization signals to one or more of the second neural network processing modules.

21. The method of claim 13, further comprising receiving, by an I/O controller of each of the first neural network processor and the one or more second neural network processing processors, data from the high-speed storage device and the second neural network processing modules.

22. The method of claim 13, further comprising temporarily storing, by a high-speed caching unit, one or more execution results generated by the neural network computing device.

23. The method of claim 13, wherein the on-chip interconnection module includes a first layer interconnection module configured to communicate with an external storage device, and one or more groups of interconnection modules, wherein at least one of the one or more groups of interconnection modules are communicatively connected to the first layer interconnection module, wherein at least another of the one or more groups of interconnection modules are communicatively connected to the first neural network processing module and the one or more second neural network processing modules, and wherein the one or more groups of interconnection modules are structured as a tree that includes the first layer interconnection module as a root node.

* * * * *